// Ruler removed
United States Patent

[11] 3,601,552

[72] Inventors Bernard Sydney Barnaby Ware; Graham Webb, Ruislip, Middlesex; Robert Andrew Stevenson, Darlington, all of, England

[21] Appl. No. 790,304
[22] Filed Jan. 10, 1969
[45] Patented Aug. 24, 1971
[73] Assignee The General Electric and English Electric Companies Limited London, England
[32] Priority Jan. 12, 1968
[33] Great Britain
[31] 1923/68

[54] REPERTORY TELEPHONE DIALLER UTILIZING BINARY STORAGE OF DIGIT VALVES

11 Claims, 7 Drawing Figs.

[52] U.S. Cl. .......... 179/90 B
[51] Int. Cl. .......... H04m 1/45
[50] Field of Search .......... 179/90 K, 90 BD, 90; 307/222, 226; 328/44, 45, 48; 235/92, 67

[56] References Cited

UNITED STATES PATENTS 3,482,058 12/1969 Guennou .......... 179/27

*Primary Examiner*—Kathleen H. Claffy
*Assistant Examiner*—Tom D'Amico
*Attorney*—Kirschstein, Kirschstein, Ottinger & Frank

ABSTRACT: An electric impulse transmitter for a telephone instrument having a pushbutton dialling mechanism comprising a cyclic dynamic store which is capable of storing binary coded values relating to, say, 12 digit values, with input and output distributors under control of which the binary values are respectively entered from the pushbutton mechanism and read out to control the operation of a 10-impulse-per-second generator. The store and the distributors comprise dynamic shift registers utilizing metal oxide semiconductor (MOS) transistors.

PATENTED AUG 24 1971

3,601,552

Figure 1:
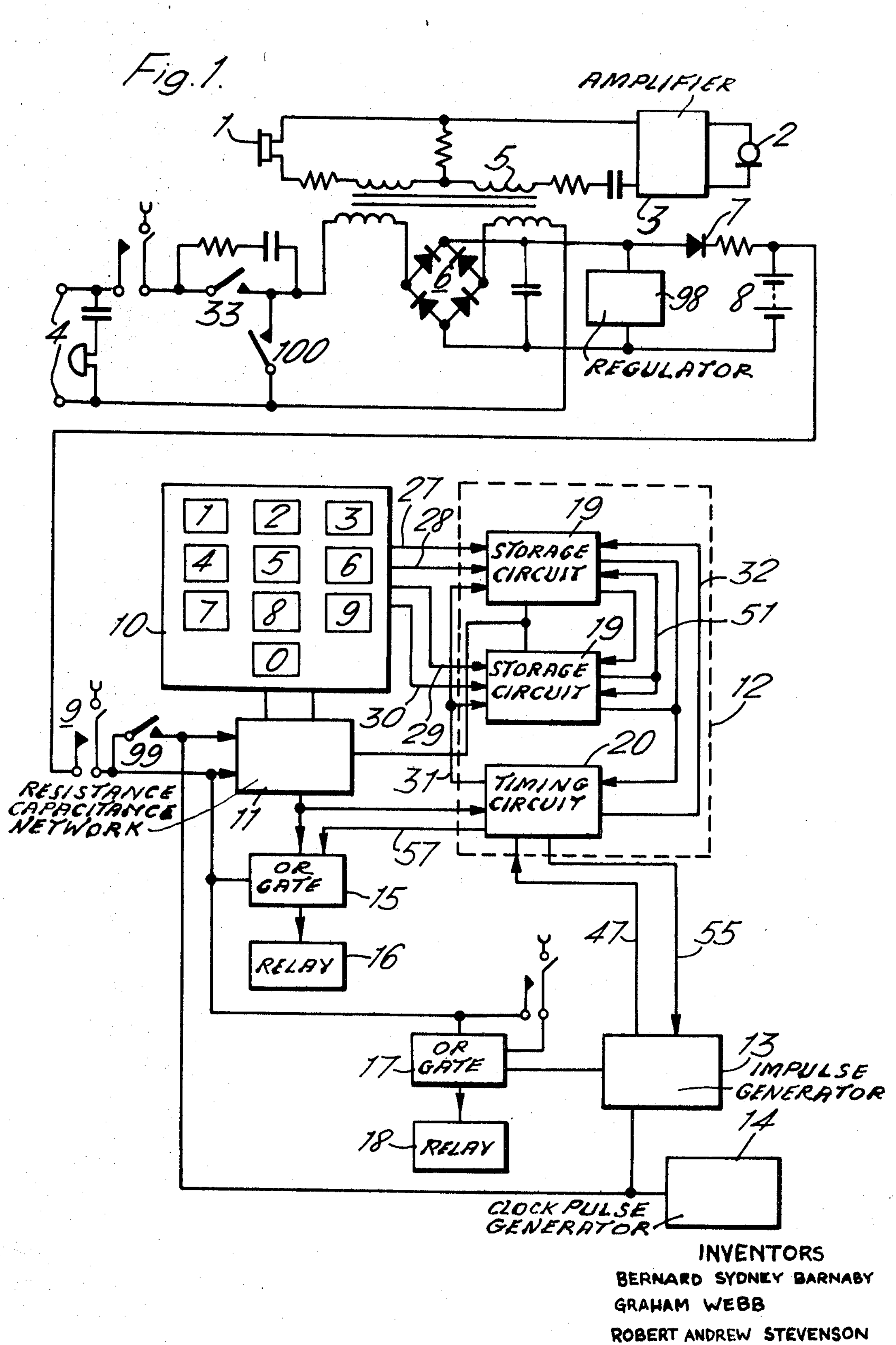

INVENTORS
BERNARD SYDNEY BARNABY
GRAHAM WEBB
ROBERT ANDREW STEVENSON

BY Kirschstein, Kirschstein, Ottinger & Frank

INVENTORS
BERNARD SYDNEY BARNABY
GRAHAM WEBB
ROBERT ANDREW STEVENSON

BY Kirschstein, Kirschstein, Ottinger & Frank

INVENTORS
BERNARD SYDNEY BARNABY
GRAHAM WEBB
ROBERT ANDREW STEVENSON
BY Kirschstein, Kirschstein, Ottinger & Frank

INVENTORS
BERNARD SYDNEY BARNABY
GRAHAM WEBB
ROBERT ANDREW STEVENSON

BY Kirschstein, Kirschstein, Ottinger & Frank

INVENTORS
BERNARD SYDNEY BARNABY
GRAHAM WEBB
ROBERT ANDREW STEVENSON
BY Kirschstein, Kirschstein, Ottinger & Frank

REPERTORY TELEPHONE DIALLER UTILIZING BINARY STORAGE OF DIGIT VALVES

The present invention relates to electric impulse transmitters.

In particular although not exclusively the invention is concerned with impulse transmitters for telephone subscribers sets in which the digits of a called number can be selected more rapidly than the telephone system is designed to accept, the digits being selected for example by means of a pushbutton "dialing" unit.

According to one aspect of the present invention, in an electric impulse transmitter for a telephone instrument there is provided a cyclic store comprising at least one binary shift register, which store is capable of storing a plurality of binary values in the respective time positions in the cycle thereof, input means under the control of which in operation one or more binary values relating to a decimal digit value of a telephone number to be signalled are written into one or more of said time positions, and means under the control of which in operation the one or more binary values relating to each decimal digit value of a telephone number to be signalled are read out of the store in turn to impulsing means which is responsive to said binary values to supply trains of electric impulses that characterize said decimal values for transmission over a telephone line connected to said instrument.

The input and output means may each comprise a binary shift register which is arranged to be cyclic in operation, and all three shift registers may utilize metal oxide semiconductor (or MOS) transistors. Each shift register may be formed by a single integrated circuit. The binary values relating to the decimal digit values of a telephone number to be called may be derived by means of a pushbutton mechanism.

According to another aspect of the present invention an electric impulse transmitter for a telephone instrument comprises a cyclic dynamic store including at least one binary shift register which is stepped by clock pulses, input and output cyclic distributors each including a respective binary shift register which each provide a timing pulse once per cycle thereof, the cycle times of the store and said distributors being equal, means responsive to an input signal and a timing signal from said input distributor to set the state of one of the stages of said store register, during at least one clock pulse period in a cycle of the register, whereby in operation at least one binary value relating to each decimal digit value of a telephone number to be signalled is written into said store, means temporarily to change the effective length of said shift register in said input distributor by one or more stages when a decimal digit value is written into said store whereby said store and said input distributor are stepped differentially, output means responsive to a timing pulse from said output distributor and to the state of a stage of said store register, at least during one clock pulse period, impulsing means controlled by said output means, and means temporarily to change the effective length of said register in said output distributor, by one or more stages, under the control of said output means whereby said store and said output distributor are stepped differentially, the arrangement being such that said impulsing means supplies a plurality of trains of impulses that are respectively characteristic of a plurality of decimal digit values written into said store.

Figure 2:
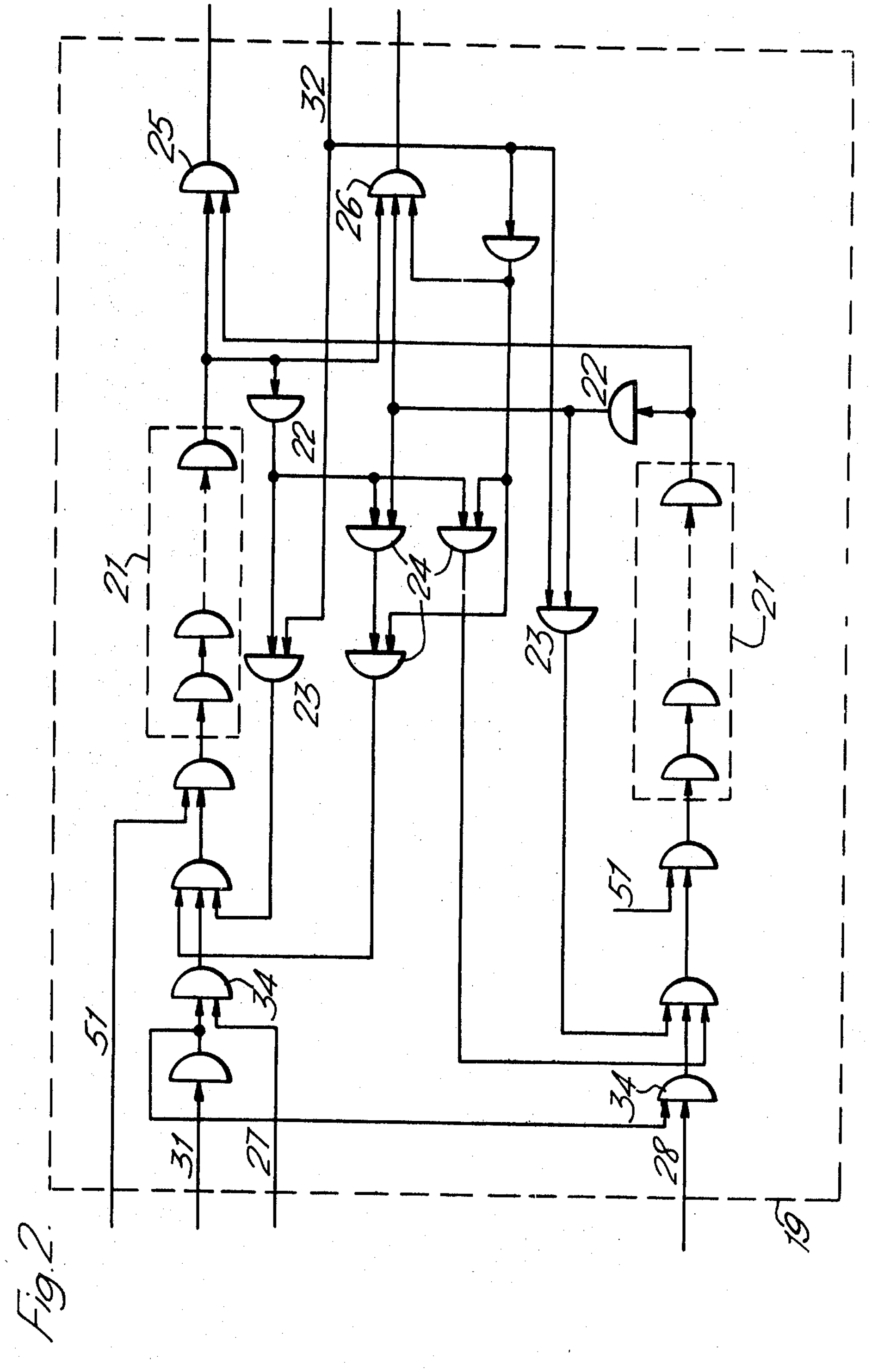
Figure 3:
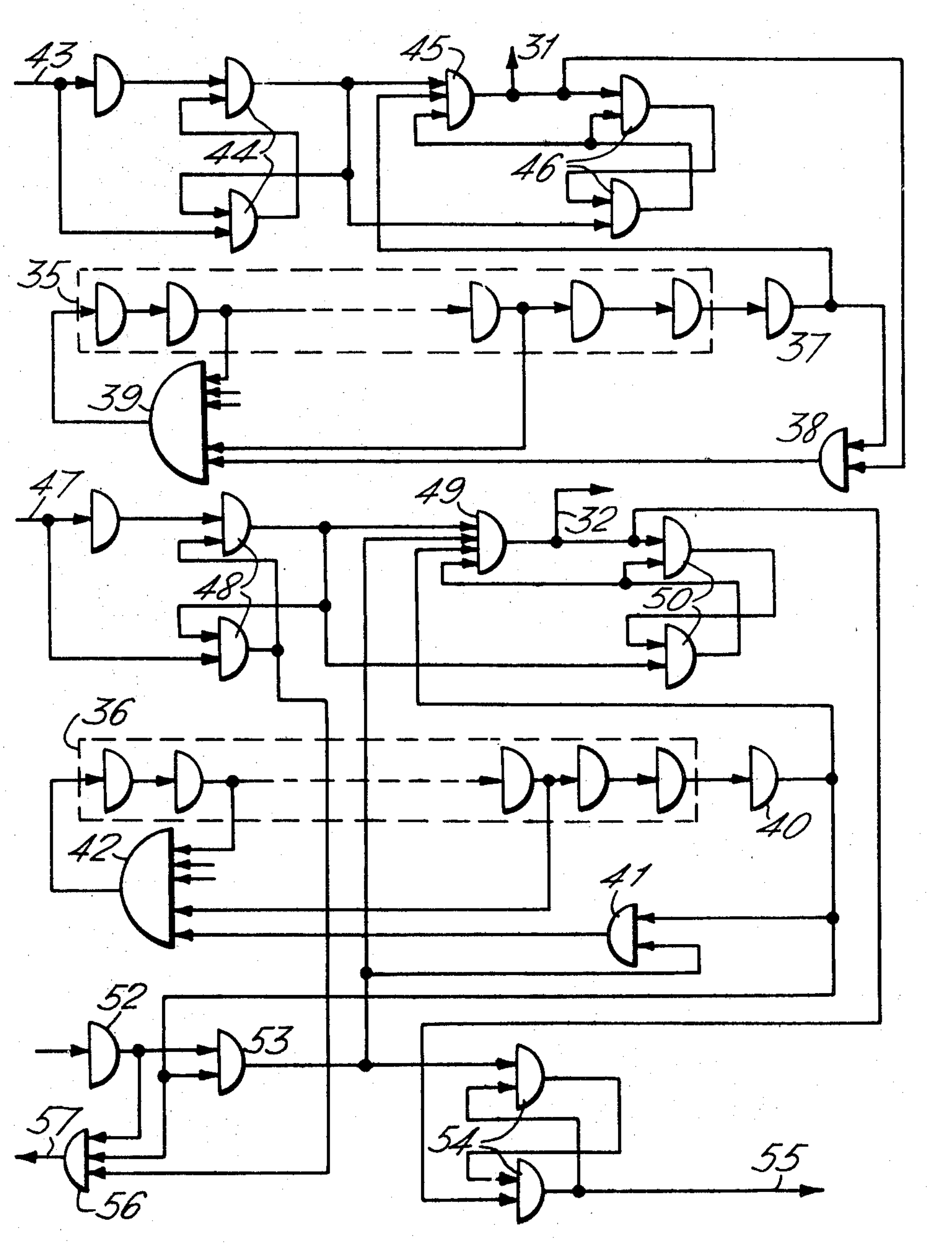
Figure 4:
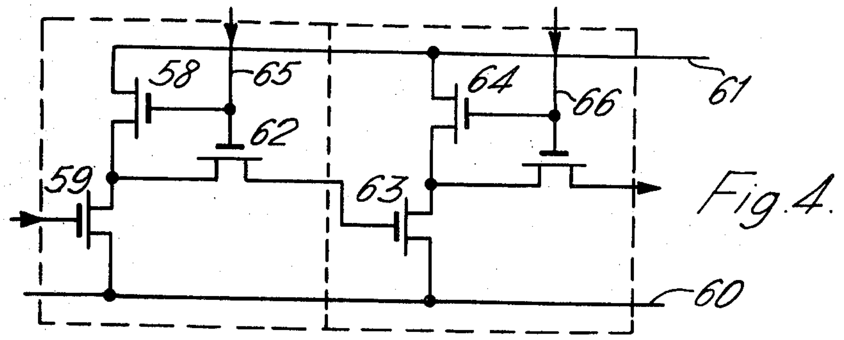
Figure 5:
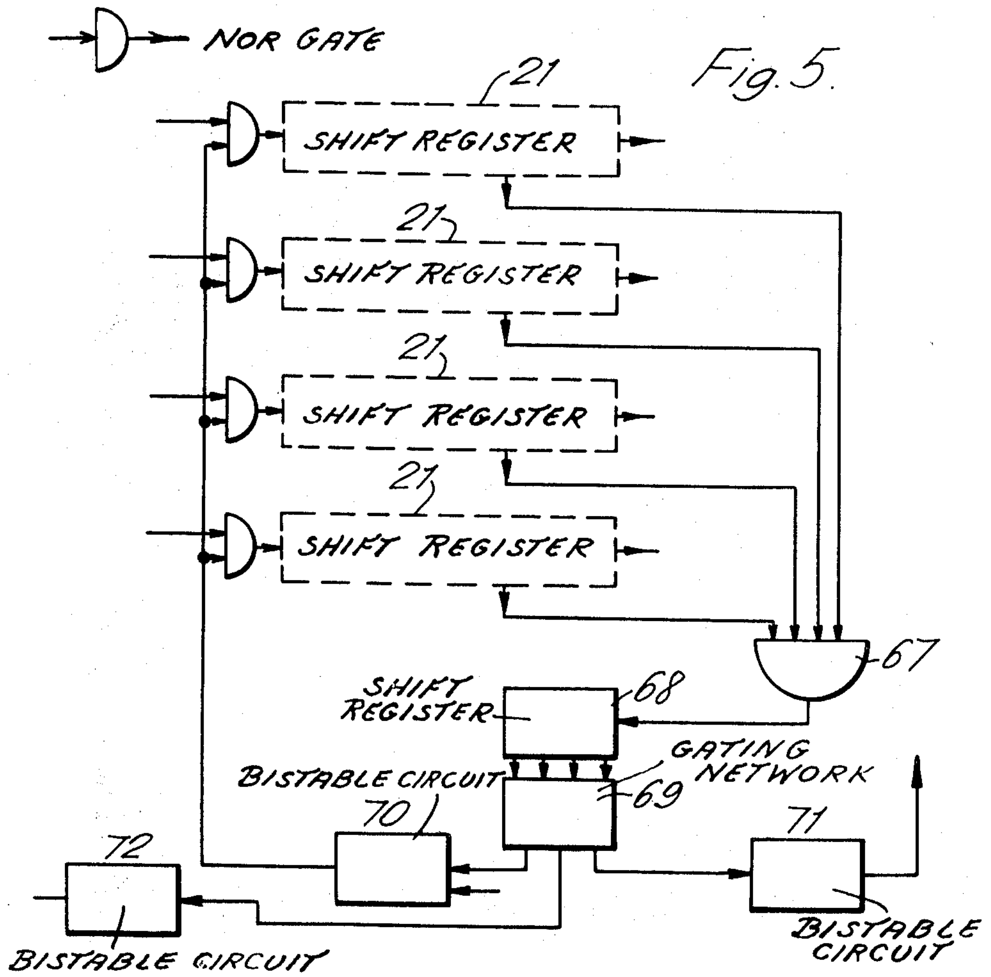
Figure 7:
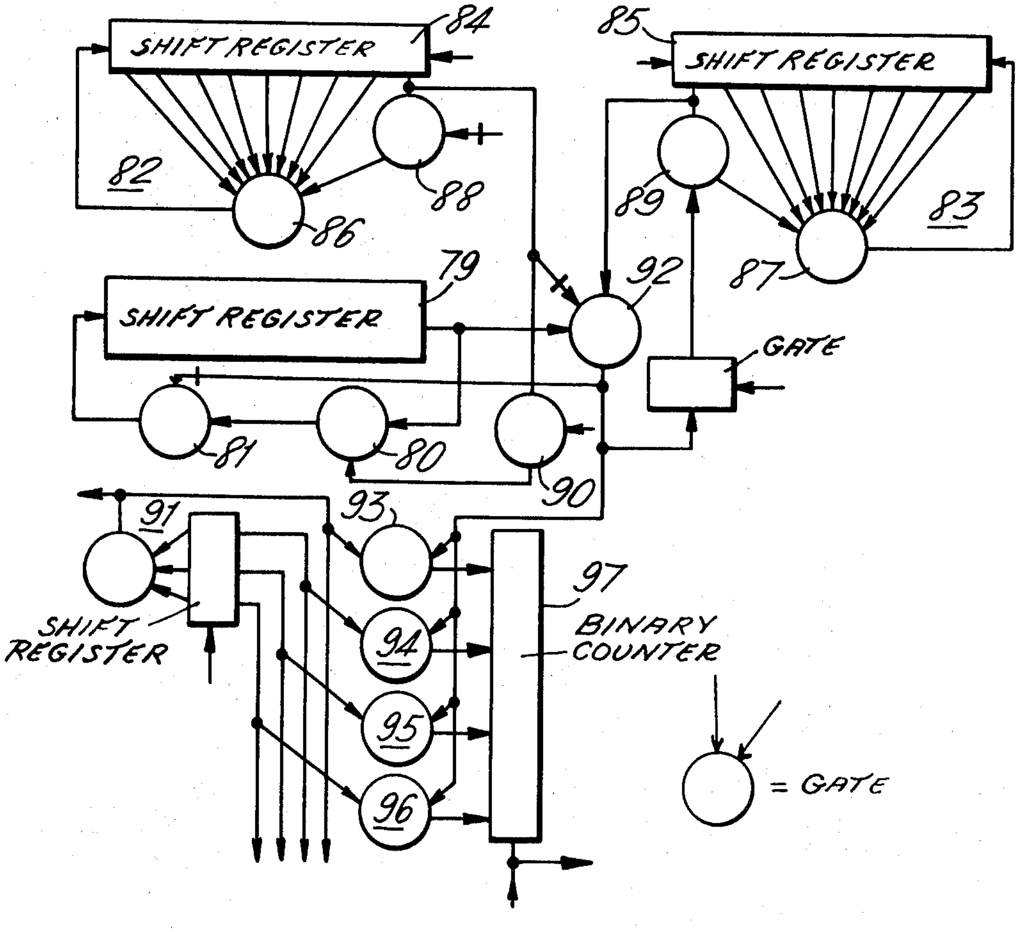

Electric impulse transmitters for telephone instruments in accordance with the present invention will now be described by way of example with reference to the accompanying drawings, of which:

FIG. 1 shows schematically the electric circuit of a telephone instrument incorporating one form of impulse transmitter in accordance with the present invention, FIG. 2 shows a part of the circuit of FIG. 1 in greater detail, FIG. 3 shows another part of the circuit of FIG. 1 in greater detail, FIG. 4 shows the circuit of certain of the logic elements shown in FIGS. 2 and 3, FIG. 5 shows a modification of the impulse transmitter shown in FIGS. 1 to 3, FIG. 6 shows a form of logic circuit which may be used in the circuit shown in FIG. 5 or in place of that shown in FIG. 4, and FIG. 7 shows an alternative form of a part of the impulse transmitter of FIG. 1.

Referring first to FIG. 1 the telephone instrument comprises a receiver 1 and a dynamic microphone 2, with its associated amplifier 3, which are coupled to a telephone line pair 4 by way of a hybrid coil 5. In a series with two windings of the hybrid coil 5 there is connected a bridge rectifier 6, the output of which is applied by way of a diode 7 to a secondary battery 8. A voltage regulator 98 is also connected across the output of the rectifier 6.

The battery 8 is connected by way of gravity switch contacts 9 to provide reference voltages for a pushbutton key unit 10 and from a resistance-capacitance network 11, and supply voltages for a storage circuit 12, an impulse generator 13, an inverter and clock pulse generator circuit 14, an OR gate 15 the output of which is arranged to operate a relay 16, and an OR gate 17 the output of which is arranged to operate a relay 18.

The storage circuit 12 comprises two similar integrated circuits 19, one of which is shown in greater detail in FIG. 2, and a third integrated circuit 20 which is shown in greater detail in FIG. 3.

Referring to FIG. 2, each integrated circuit 19 comprises a single chip of semiconductor material in which are formed a large number of metal oxide semiconductor (MOS) transistors, these transistors being interconnected to make up logic circuits all having the general function of NOR gates. In each circuit 19 there are provided tow identical 12-stage dynamic shift registers 21 which are arranged by way of gate circuits 22 and 23 to by cyclic in operation. In addition there are provided logic circuits 24 for counting out digit values entered in the shift registers 21 in accordance with counting rules described hereinafter, together with a zero-detecting gage 25 and a "carry" gate 26.

The decimal digit values associated with the pushbuttons of the unit 10 are represented by different combinations of four binary values, and when a pushbutton is operated the respective four binary values are applied respectively to the input paths 27 to 30 of the four shift registers 21, while timing pulses from the circuit 20 are applied to an input path 31. Pulses for counting out purposes are applied to an input path 32 from the circuit 20.

The four binary values which characterize a particular decimal digit value are entered in parallel in the input stages of (stored in a particular time position in) the storage registers 21 and are stepped together (in parallel) through said registers 21 by clock pulses from the generator 14 so that (and), once each cycle of the registers 21, the said binary values are present simultaneously in the respective last stages of the registers 21 (thereof). When a particular decimal digit value is to be read out a "count" pulse derived from the circuit 20 is applied, at the required time in a cycle, over the path 32 to interrupt the connections which make the storage registers 21 cyclic in operation and to enable the logic circuits 24 which, in accordance with predetermined logic rules, return to the input stages of the storage registers 21 binary values representing a decimal value smaller by one than the decimal value appearing at the output stages of the registers 21. When a "count" pulse is applied to the registers 21 the impulse generator 13 is enabled and an impulse of the required duration is applied to the telephone line pair 4 by operation of contacts 33 of the relay 18. After a period of approximately 100 milliseconds, determined by the impulse generator 13, another "count" pulse is applied, at the required time in the cycle, over the path 32 whereby the decimal value that is being read out is again reduced by one. In this way "count" pulses are applied to reduce the decimal value that is being read out, and impulses are applied to the telephone line pair 4 once per "count"

pulse and at a repetition rate of approximately 10 impulses per second, until the decimal value being read is reduced to zero.

To provide a set of binary values to represent the decimal digits used in telephone signalling which requires only simple logic circuits for "counting" down during readout, the pushbuttons of the key unit 10 are arranged on operation to apply a predetermined potential to one or more of the four paths 27 to 30, as follows:

the pushbuttons for digits 1, 4, 7 and 10 (or 0) apply the potential to the path 27,
pushbuttons for digits 3, 6 and 9 apply the potential to the path 28,
the pushbuttons for digits 1, 2, 3 and 10 (or 0) apply the potential to the path 29, and
the pushbuttons for digits 7, 8, 9 and 10 (or 0) apply the potential to the path 30.

The potential corresponds to the binary value "1," and during the period of the input timing pulse the paths 27 to 30 are connected to the inputs of respective ones of the four storage registers 21, the binary values being inverted before they are entered in the registers 21. The code which results from these connections can be "counted down" during readout by means of the logic circuits 24. Thus during readout, if the output of the upper storage register 21 or the lower storage register 21 (as shown in FIG. 2) is "0" a "1" is returned to the upper register 21, if the output of the upper register 21 is a "1," a "1" is returned to the lower register 21, and if the output of the upper register 21 is a "0" while the output of the lower register 21 is a "1" then a carry "1" is applied by the gate 26 to count down the other two registers in a similar manner. The same rules apply for the other two registers 21 except that when the carry signal is produced a zero is returned to all four registers 21.

Referring not to FIG. 3, the circuit 20 comprises two 11-stage dynamic shift registers 35 and 36 which are each arranged, by way of gates 37, 38 and 39, and 40, 41 and 42 respectively, to be cyclic in operation with a single "1" value circulating around each of the registers 35 and 36. Because this "1" value also passes through the respective gates 37 to 39 and 40 to 42 each combination of register and gates acts effectively as a 12-stage distributor arrangement.

In response to operation of a set of contacts (not shown) which are common to all the pushbuttons of the key unit 10, whenever one of the pushbuttons is operated a logic "0" is applied to an input path 43 of the circuit 20, a bistable circuit comprising a pair of gates 44 is set to a given state, and when the "1" circulating through the register 35 next appears at the gate 37 a gate 45 applies a write pulse of value "1" to the path 31 in each of the circuits 19, whereby the binary values corresponding to the operated pushbutton may be applied to the registers 21 by way of the respective gates 34. At the same time a "1" is applied to an input of the gate 38 to that the input distributor is effectively temporarily shortened by one stage each time a write pulse occurs, and a bistable circuit comprising gates 46 is set to establish a "1" input for the gate 45 to terminate the write pulse after a short delay.

At the commencement of a "loop bread" signal produced by the impulse generator 13 during the counting out of binary values from the storage registers 21 a logic "0" is applied to an input path 47 of the circuit 20, a bistable circuit comprising gates 48 is set and, when the "1" circulating through the register 36 next appears at the gate 40 a gate 49 applies a count pulse of value "1" to the path 32 of one of the circuits 19. At the same time a "1" is applied to an input of a bistable circuit comprising gates 50 which operates to terminate the count pulse after a short delay by means of a logic "1" applied to an input of the gate 49.

The count pulses on the path 32 of said one of the circuits 19 ensure that the outputs of both of the gates 23 are "0" and permit the gates 24 to return to the inputs of the registers 21 respective binary values which, in accordance with the counting rules described above represent a digit value less by one than the digit value represented at the outputs of the registers 21. If a "carry" pulse is produced by the gate 26 in response to a count pulse on the path 32 of said one of the circuits 19 this carry pulse is applied to the path 32 of the other of the circuits 19 so as to act in effect as a count pulse.

When the digit value being read out of the storage registers 21 has been reduced to zero by the count pulses, at which time the gates 26 of the two circuits 19 are both producing carry signals, the gate 26 of the second circuit 19 sets the inputs of all four registers to zero by means of a pulse applied over the path 51. When these zeros appear at the outputs of the registers 21 the gates 25 apply a pulse to a gate 52, and since at the same time the "1" circulating in the register 36 is present at the output thereof zeros are applied to both inputs of a gate 53. The resulting "1" output of this gate 53 blocks the production by the gate 49 of count pulses, causes the output distributor to be effectively shortened by one stage by applying a "1" input to the gate 41, and sets a bistable circuit comprising gates 54 to apply a "1" to the impulse generator 13 by way of the path 55. The "1" circulating in the register 36 is now in step with the digit value stored in the "time slot" adjacent to that which has just been counted out. If this digit value is zero the output distributor is temporarily shortened again at the end of the next cycle by means of a pulse applied to the gate 41 from the gate 53. The output distributor is therefore stepped differentially with respect to the time slots of the storage registers 21 until the next number to be counted out is found. If the storage registers 21 are empty a zero will be present at one input of a gate 56 from the gate 52 when the bistable circuit 48 is reset at the end of the last loop break signal on the path 47. When the output of the gate 40 is next zero therefore the gate 56 will provide a pulse on the path 57 which effects the release of the relay 16 and it contacts 99 and 100 open, whereby the impulse generator 13, the inverter 14 and the circuits 19 and 20 are deenergized and the impulsing loop is opened.

The circuit 20, like the circuits 19, comprises a single chip of semiconductor material in which are formed a large number of MOS transistors. The chips bearing the two circuits 19 and the circuit 20 are each accommodated in a type TO5 can, since no more than 12 connecting leads are required for any one chip, but it is possible that all three circuits could be formed in a single chip accommodated in a single can.

Referring to FIG. 4, each shift register stage in the shift registers 21, 35 and 36 comprises two transistors 58 and 59 connected in series between the power supply lines 60 and 61 with a transistor 62 coupling the junction between the transistors 58 and 59 to the input electrode of a transistor 63, which in turn is connected in series with a transistor 64 between the supply lines 60 and 61. The shift registers are stepped by means of two interlaced trains of clock pulses from the inverter 14 which are applied to the paths 65 and 66 respectively, the binary values being represented by potentials applies to and temporarily stored by the capacitive input electrodes of the transistors 59 and 63. The inverter 14 may operate at 10 kilocycles per second, and the output of the inverter 14 may be transformed and rectified to provide the supply voltage for the impulse generator 13.

Referring now to FIG. 5, the timing pulses for writing binary values into the storage registers 21 or counting down binary values in the storage registers 21 may be derived by sensing the time positions of any binary values that are already present in the storage registers 21. An output is taken from the ninth stage of each register 21 and is applied to a common gate 67, whereby binary values denoting the presence or absence of stored values in the successive time slots in the registers 21 may be stepped through a three-stage register 68. In dependence upon the outputs of a gating network 69 which receives signals from each stage of the register 68 bistable circuits 70, 71 and 72 are set respectively to time the writing of binary values into the registers 21, the counting out of values, and to indicate whether or not the storage registers 21 are empty. This arrangement has the advantage that the distributor registers 35 and 36 are no longer required.

Figure 6:
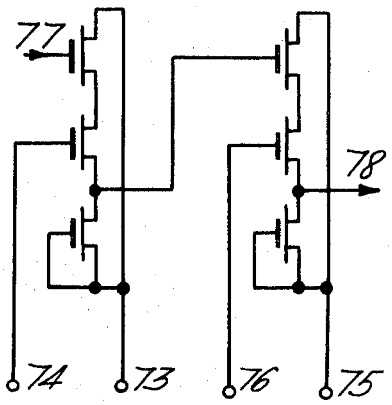

If the inverter 14 is adapted to provide four interlaced trains of clock pulses instead of two the circuit shown in FIG. 6 may be used for each shift register stage, and similar series combinations of MOS transistors may be used to act, as for example, AND gates. The four trains of clock pulses are applied respectively to the paths 73 to 76 while the input is applied to the path 77 and the output is taken from the path 78. Circuits of this form have the advantages of requiring less current from the power supply and permitting physically smaller transistors to be used.

The operation of the above-described impulse transmitter may be illustrated with an example, say, the signaling of the telephone number 230-1212 as follows:

When the handset of the instrument is lifted the network 11 is connected by way of the gravity switch contacts 9 to the battery 8, and bias potentials are applied from the network 11 to the key unit 10. When the pushbutton for the digit value 2 is operated the binary "0" on the path 43 enables the relay 16 to be energized by way of the OR gate 15 whereupon the contacts 100 of the relay 16 loop the subscriber's line and the contacts 99 energize the impulse generator 13, the inverter 14 and the circuits 19 and 20. At the same time the binary "0" on the path 43 initiates the generation of a write pulse on the path 31, and operation of the pushbutton also causes binary "0" values to be applied to each of the paths 27, 28 and 30 and a binary "1" to be applied to the path 29 to represent the digit value "2" of the operated pushbutton. These latter four binary values are therefore applied to the respective input gates 34 of the four registers 21 and, when the write pulse occurs on the path 31, are entered simultaneously in the first stages of the respective registers 21. Thereafter, until the digit value is completely counted out of the store these binary values, or the remainder left during counting out, are stepped together repeatedly through the registers 21 by clock pulses having a repetition rate of 10,000 pulses per second.

When the write pulse is applied to the path 31 the input distributor 35 is temporarily shortened by one stage, and this has the result that the next write pulse will be generated when the binary values for the digit "2" are entering the respective last stages of the registers 21. When the pushbutton for the digit value "3" is operated therefore, so that binary "0" values are applied to the paths 28 and 29, these binary values are entered into the respective registers 21 and circulate one stage ahead of the binary values for the digit "0." Similarly the binary values for the digit "0" will be entered and circulate in the registers 21 one stage ahead of the binary values for the digit "3." The registers 21 can hold the binary values for up to 12 digits, so that all seven of the digits of the number to be signalled may be entered in the store in succession by operation of the respective pushbuttons.

While the impulse generator 13 is energized it continually causes the relay 18 alternately to be energized and deenergized so that the contacts 33 alternately make and break the telephone line loop. When the first loop break occurs the bistable circuit 48 is set, and if the timing pulse circulating in the register 36 is out of step with the binary values in the registers 21 representing the digit "2," as signalled by an impulse applied to gate 52, the gate 41 operates to return the timing pulse to the register one stage earlier each cycle until the timing pulse "catches up" with the binary values of the digit "2." At this time the gates 25 indicate the presence of the binary values in the last stages of the four storage registers 21 by applying a zero to the gate 52, and the gates 40 and 52 both apply zeros to respective inputs of the gate 49 whereupon a count pulse is applied over the path 32 to the counting logic circuits 23 and 24. According to the logic rules described above binary values are then returned to the inputs of the four registers 21 representing the original digit value minus one, in this case the binary values representing the digit "1" are returned to the inputs of the registers 21.

These binary values then continue to circulate in their respective registers 21 in step with each other and with the timing pulse in the register 36, and when the next loop break signal sets the bistable circuit 48 another count pulse is applied to the path 32, which has the effect of reducing the binary values of the first digit by one again, whereupon the carry gate 26 of the second circuit 19 sets the inputs of all four registers 21 to binary zero. When these binary zeros next appear at the outputs of the registers 21 the gates 25 apply a pulse to the gate 52 whereupon the gate 53 operates as described above to move the timing pulse in the register 36 one stage earlier in its cycle and sets the bistable circuit 54 to initiate an interdigit pause. The consequent binary "1" on the path 55 causes the generator 13 to hold the loop make condition for a predetermined time of said one-half to 1 second.

At the end of the interdigit pause the loop break signal on the path 47 sets the bistable circuit 48, and since the timing pulse in the register 36 is now in step with the binary values in the registers 21 which represent the digit value "3" these values will be counted down to zero by this loop break and the next two. There will then follow a second interdigit pause and a succession of 10 loop breaks to count out the digit value "0," and so on. In this way all seven digit values are read out of the registers 21 in succession and corresponding trains of impulses are applied to the line 4.

If say, the last four digits are not entered in the registers 21, due to hesitancy on the part of the operator, by the time the digit value "0" has been read out the gate 56 will be operated in response to the "store empty" signals to switch off the generator 13 until the next pushbutton is operated.

Referring to FIG. 7, an alternative form of store for the impulse transmitter comprises a 40-stage shift register 79 the output stage of which is connected by way of an OR gate 80 and an AND gate 81 in sequence to the input stage of said register 79. The register 79 is stepped continually by clock pulses at a rate of, say, 10,000 pulses per second and, provided that other inputs to the AND gate 81 are of a required value as will be described, binary values appearing at the output stage of the register 79 are returned to the input stage so that the register is cyclic in operation.

Two identical cyclic timing pulse generators or distributors 82 and 83 are provided, each comprising a nine-stage binary shift register 84 or 85 and a nine-input OR gate 86 or 87 to which an output from each of the nine stages is connected, the output of the last stage being connected thereto by way of a two-input AND gate 88 or 89. In operation of each of these distributors a "1" is stepped stage by stage through the respective register 84 or 85 by pulses at a rate one-quarter of that applied to the register 79, that is at 2,500 pulses per second, and while this "1" is present in any one of the nine stages the OR gate 86 or 87 is arranged to apply a "0" input to the first stage of the respective register 84 or 85. When the "1" state is stepped out of the ninth stage, however, the respective OR gate 86 or 87 responds to apply a "1" input to the first stage. Thus each of these registers is arranged to be cyclic, their cycle times being the same as that of the register 79.

The distributor 82 provides timing pulses once each cycle by way of an AND gate 90 and the OR gate 80 to enable binary coded information to be written into the storage register 79. Each timing pulse is of a duration equal to four clock pulse periods, and the binary coded information, relating to the decimal values of successive digits of a telephone number to be called, comprises groups of four binary elements in sequence, each group of four elements relating to one decimal digit. During any one timing pulse therefore the values of four binary elements may be written into the storage register 79 in sequence, and these values will be stepped repeatedly through the register 79.

The binary coded information relating to the telephone number to be called is derived from the pushbutton key unit 10 by means of contacts on the pushbutton which when operated serve to apply predetermined potentials to respective ones of four conductors associated with different code weights, these conductors then being connected in turn during successive clock pulse periods, under the control of a four-output distributor 91 which is stepped by clock pulses, to a second input of the AND gate 90.

When any one of the pushbuttons of the key unit 10 is operated a potential is applied temporarily to the second input of the AND gate 88 of the input distributor 82 such as effectively to disconnect the output of the ninth stage of the register 84 from the OR gate 86, so that the register 84 is temporarily one stage shorter. The next timing pulse and subsequent timing pulses from this distributor 82 therefore occur earlier by one step of the register 84, that is by four clock pulse periods, than those timing pulses preceding the operation of the pushbutton. Thus as successive pushbuttons are operated the input distributor 82 operates to provide timing pulses which assign different ones of 10 time slots in the cycle of the storage register 79 to successive groups of binary elements, each time slot taking four clock pulse periods to pass through any one stage of the storage register 79.

The output distributor 83 supplies a timing pulse, once per cycle of its register 85, to one input of an AND gate 92 to the other inputs of which are applied respectively and output from the last stage of the storage register 79 and an inverted output from the input distributor 82. The gate 92 operated to apply binary values from the output of the storage register 79 to inputs of four AND gates 93 to 96 the outputs of which are applied to respective stages of a four-stage binary counter 97. The gates 93 to 96 are enabled in turn by pulses from the four-output distributor 91 so that during an output timing pulse the four successive binary values read out of the storage register 79 are entered in respective stages in said counter 97.

Following readout of a group of binary values the effective length of the register 85 of the output distributor 83 is temporarily changed, in a similar manner as in the input distributor 82, so that subsequent output timing pulses select the next time slot to be read out. In addition impulses at a rate of 10 per second are applied to the counter 97 to step it to its original state, these impulses also being passed to the telephone line pair 4 to signal the decimal value represented by the four binary values entered in the counter 97 from the storage register 79. Since the counter 97 can accommodate numbers up to 15, whereas 10 is the highest number to be signalled, the extra steps of the counter 97 may be arranged to provide a fixed length pause between impulse trains.

The circuits shown in FIG. 7 may also utilize MOS transistors.

Due to the use of MOS transistors in the different forms of storage arrangements described above very little power is required for energizing the registers and gating circuits, but since power cannot be obtained from the exchange during impulsing the small rechargeable storage battery 8 is provided, this battery being recharged from the exchange battery during the off-hook condition, except during impulsing, by way of a shunt voltage regulator circuit 98 and a rectifier element 7 provided at the telephone instrument. The rectifier element 7 serves to prevent discharge of the battery 8 by way of the regulator circuit 98.

According to yet another aspect of the invention therefore in a telephone instrument which in use is connected by way of a telephone line to an exchange, said instrument including one or more electric circuits which utilize active elements and which may, for example, form part of an impulse transmitter, there are provided a chargeable battery from which in operation said electric circuits are energized, and a charging circuit connected between the telephone line on one hand and said battery on the other hand to pass at least part of the unidirectional line current to said battery for the purpose of charging that battery when the telephone instrument is in the off-hook condition and dialing impulses are not being transmitted by said instrument over said telephone line.

Although the impulse transmitters in accordance with the invention have been described with reference to pushbutton key units, it will be appreciated that the transmitters may be used in conjunction with card dialer or other mechanisms.

We claim:

1. An electric impulse transmitter for a telephone instrument, said transmitter comprising a cyclic dynamic store including at least one binary shift register, which store is capable of storing a plurality of binary coded values in respective time positions in the cycle thereof, input and output cyclic distributors each including a respective binary shift register, means responsive to timing signals from the input distributor to enter in successive time positions in the store binary coded digit values representing a telephone number to be signalled, output means responsive to timing signals from the output distributor, and impulsing means controlled by said output means to supply a succession of trains of impulses that are respectively characteristic of the binary coded digit values entered in the store.

2. An electric impulse transmitter in accordance with claim 1 wherein all three shift registers utilize metal oxide semiconductor transistors.

3. An electric impulse transmitter in accordance with claim 1 wherein each shift register is formed as at least a part of an integrated circuit.

4. An electric impulse transmitter in accordance with claim 1 includes a pushbutton mechanism by means of which the binary coded values of a telephone number to be called are derived.

5. An electric impulse transmitter for a telephone instrument comprising a cyclic dynamic store including at least one binary shift register which is stepped by clock pulses, input and output cyclic distributors each including a respective binary shift register which each provide a timing pulse once per cycle thereof, the cycle times of the store and said distributors being equal, means responsive to an input signal and a timing signal from said input distributor to set the state of one of the stages of said store register, during at least one clock pulse period in a cycle of the register, whereby in operation at least one binary value relating to each decimal digit value of a telephone number to be signalled is written into said store, means temporarily to change the effective length of said shift register in said input distributor by one or more stages when a decimal digit value is written into said store whereby said store and said input distributor are stepped differentially, output means responsive to a timing pulse from said output distributor and to the state of a stage of said store register, at least during one clock pulse period, impulsing means controlled by said output means, and means temporarily to change the effective length of said register in said output distributor, by one or more stages, under the control of said output means whereby said store and said output distributor are stepped differentially, the arrangement being such that said impulsing means supplies a plurality of trains of impulses that are respectively characteristic of a plurality of decimal digit values written into said store.

6. An electric impulse transmitter in accordance with claim 5 wherein said store comprises four similar shift registers through which are stepped in parallel four binary values relating to each decimal digit value written into said store.

7. An electric impulse transmitter in accordance with claim 6 wherein said store comprises logic circuits arranged to return to the inputs of said four shift registers, upon the occurrence of each impulse from said impulsing means, binary values, in respect of the digit value being read from said store, which represent a digit value one less than that appearing at the outputs of said four registers, whereby said digit value is progressively counted down to zero and said impulsing means supplies a train of impulses characteristic of that digit value.

8. An electrical impulse transmitter in accordance with claim 5 wherein said store comprises one binary shift register the four binary values relating to a decimal digit value being written in succession into said binary shift register and subsequently being transfered on readout to set a four-stage binary counter, this counter being progressively reset to zero by impulses from said impulsing means to provide a train of impulses characteristic of that digit value.

9. An electric impulse transmitter in accordance with claim 5 wherein said shift registers utilize metal oxide semiconductor transistors.

10. An electric impulse transmitter in accordance with claim 5 wherein each shift register is formed as at least a part of an integrated circuit.

11. An electric impulse transmitter for a telephone instrument, said transmitter comprising a cyclic dynamic store including at least one binary shift register, which store is capable of storing a plurality of binary coded values in respective time positions in the cycle thereof, distributor means to derive cyclic input and output timing signals respectively once per cycle of the storage shift register, means responsive to input timing signals from the distributor means to enter in successive time positions in the store binary coded digit values representing a telephone number to be signalled, output means responsive to output timing signals from the distributor means, and impulsing means controlled by said output means to supply a succession of trains of impulses that are respectively characteristic of the binary coded digit values entered in the store.

PO-1050
(5/69)

UNITED STATES PATENT OFFICE
CERTIFICATE OF CORRECTION

Patent No. 3,601,552 Dated August 24, 1971

Inventor(s) BERNARD SYDNEY BARNABY, et al.

It is certified that error appears in the above-identified patent and that said Letters Patent are hereby corrected as shown below:

Page 1, change the name of the assignee from

"The General Electric and English Electric Companies Limited" to

-- The General Electric Company Limited -- .

Signed and sealed this 10th day of October 1972.

(SEAL)
Attest:

EDWARD M.FLETCHER,JR.
Attesting Officer

ROBERT GOTTSCHALK
Commissioner of Patents